United States Patent [19]

Jessee

[11] 4,443,842

[45] Apr. 17, 1984

[54] INVERTER FIRING CONTROL WITH COMPENSATION FOR VARIABLE SWITCHING DELAY

[75] Inventor: Ralph D. Jessee, Lima, Ohio

[73] Assignee: Westinghouse Electric Corp., Pittsburgh, Pa.

[21] Appl. No.: 355,073

[22] Filed: Mar. 5, 1982

[51] Int. Cl.³ .................... H02M 7/537; H02M 1/12
[52] U.S. Cl. ........................................ 363/41; 363/98; 363/132
[58] Field of Search .................................. 363/40–42, 363/55–58, 95–98, 131–139

[56] References Cited

U.S. PATENT DOCUMENTS

| 3,624,486 | 11/1971 | Oates | 363/41 |
|---|---|---|---|
| 3,710,229 | 1/1973 | Jessee | 363/41 |
| 3,715,649 | 2/1973 | Ravas | 363/42 |
| 3,781,634 | 12/1973 | Jessee | 363/41 |
| 3,967,173 | 6/1976 | Stich | 363/132 |
| 4,166,247 | 8/1979 | Miyazawa | 363/41 X |
| 4,179,727 | 12/1979 | Muto et al. | 363/41 |
| 4,228,491 | 10/1980 | Abraham et al. | 363/41 |
| 4,291,368 | 9/1981 | Yarema et al. | 363/41 |
| 4,370,702 | 1/1983 | Shuey et al. | 363/98 X |

Primary Examiner—Peter S. Wong
Attorney, Agent, or Firm—R. P. Lenart

[57] ABSTRACT

A pole switch firing control for a pulse width modulated inverter controls pole switch operation under steady state operating conditions such that the inverter output duplicates a reference signal waveform after a fixed time delay. Pole switch operating time for a given pulse in an inverter output cycle is measured and subtracted from a fixed time interval to get a delay time. In the succeeding output cycle, the corresponding pulse is produced by initiating the pole switch operating sequence after the delay time, thereby causing the pole switch to operate a fixed time following the reference signal.

14 Claims, 6 Drawing Figures

INVERTER FIRING CONTROL WITH COMPENSATION FOR VARIABLE SWITCHING DELAY

BACKGROUND AND SUMMARY OF THE INVENTION

This invention relates to electrical inverters and more particularly to circuits for controlling power pole switching in pulse width modulated inverters.

Pulse width modulated D.C. to A.C. inverters approximate sine-wave outputs by switching power pole switches at a rate higher than the fundamental sine-wave frequency. In the design of pulse width modulated D.C. to A.C. inverters, it is desirable to switch the power stage in a manner which reduces certain harmonics to low values so as to ease the burden of filtering the output power to obtain a sinusoidal voltage wave. Fairly small errors in switching times can produce harmonic voltages many times greater than desired. This usually results in the circuit filter being made considerably larger than theoretically necessary to suppress these harmonics.

In a transistor inverter, for example, it is necessary to provide an underlap condition to prevent shoot-through during the switching operation. This means that to switch an output point from one polarity to another, there must be a delay after the conducting transistor is turned off, to be sure it is no longer conducting, before the other transistor is turned on. Many times load conditions are such that the second transistor does not conduct at all since load current is shunted through a commutating diode, thereby shortening the switching time to that of the transistor turn-off time. Thus the switching time is quite variable depending on the instantaneous load current as well as the transistor turn-off characteristic. Therefore, the prescribed switching schedule is not met, resulting in unpredicted harmonics.

The present invention minimizes output distortion due to switching errors by predicting the switching time required for each switching point and using this prediction to adjust the starting time for each switching period so that switching is accomplished on schedule. In general a reference waveform which is to be reproduced at the power pole output will be available to the switching control circuitry. Pulses within the reference wave are to be reproduced at the power pole output after a preselected time interval.

This delayed switching schedule is accomplished by measuring the power pole switching time for a given pulse in an output cycle and subtracting the measured switching time from the preselected time interval to obtain a delay time. The switching period for the corresponding pulse in the succeeding output cycle is then initiated at a point equal to the delay time, as obtained from the previous cycle, following the appropriate reference waveform pulse. This process is repeated for each power pole output pulse. During steady state operation, it is reasonable to expect that switching periods will be the same length at corresponding switching points in each subsequent cycle. Therefore, the power pole will switch after a preselected time interval following the reference wave pulses.

A control circuit constructed in accordance with this invention includes means for measuring switching time, means for determining the difference between a preselected time interval and the measured switching time to obtain a delay time, and means for initiating the power pole switching sequence for the corresponding pulse in the succeeding output cycle after the delay time following an appropriate pulse in the reference waveform. By appropriately timing the switching function, multiple phase inverters can be controlled by a single control circuit.

D.C. content of the inverter output is controlled by sensing D.C. content, generating a compensation signal, and varying pulse width of the output pulses in response to the compensation signal. A circuit which accomplishes this compensation includes an integrator which senses D.C. content of the output and produces a compensation signal and a comparator which compares the compensation signal to the power pole output voltage which has been reduced by a voltage divider and modified to have controlled rise and fall times. The comparator then produces a signal representing the phase voltage modified in pulse width depending on D.C. content. When the modified phase voltage signal is fed back to the firing control circuit, the firing circuit alters the power pulse width to eliminate the D.C. component of the output.

DESCRIPTION OF THE PREFERRED EMBODIMENTS

Figure 1:
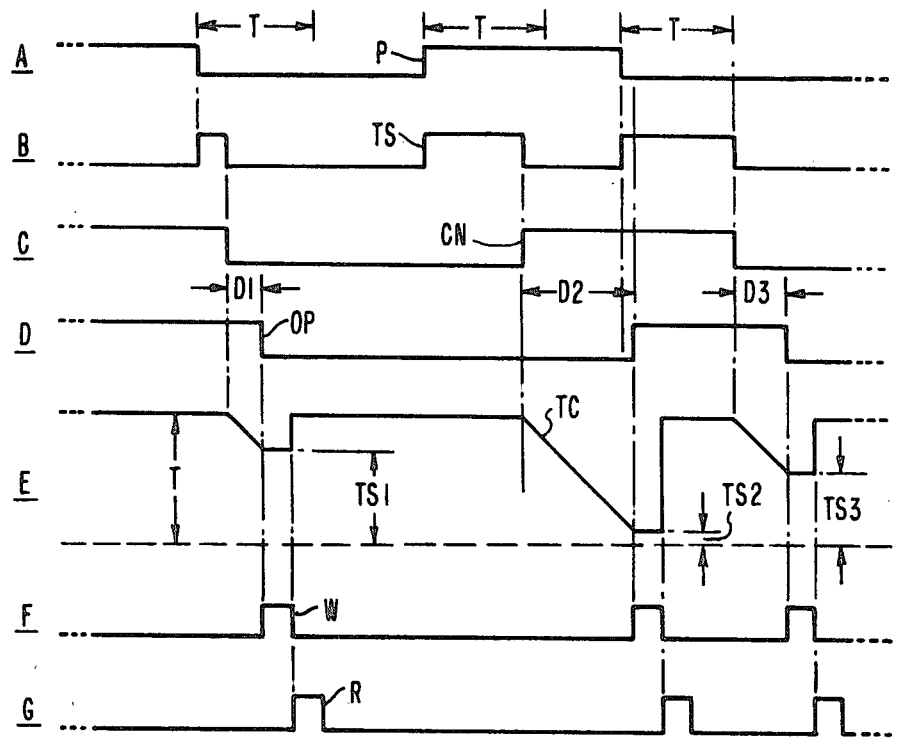
FIG. 1 is a series of waveforms illustrative of the function of an inverter firing control in accordance with the present invention.

Referring to the drawings, the waveforms of FIG. 1 illustrate the operation of the inverter firing control method and apparatus of this invention for a portion of a single output cycle of a pulse width modulated inverter. FIG. 1A shows a pulse wave P which is part of a reference signal that is to be reproduced at the inverter power pole output. The reference signal may be generated within the inverter firing control circuitry or may be received from an external source. A fixed time interval T is shown with respect to each transition point of pulse wave P. This invention acts to make the inverter power pole switch at the end of each period T, thereby causing the inverter output to reproduce the reference signal. To maintain proper firing control function, time interval T must be at least as long as the maximum switching time of the power pole.

Pulse wave TS of FIG. 1B contains a history of the switching times for each switching point in the previous inverter output cycle. The length of each pulse in pulse wave TS corresponds to the difference between a power pole switching time and fixed time interval T.

Control signal CN of FIG. 1C responds to the completion of each pulse in pulse wave TS, and is used to initiate the power pole switching sequence. During steady state operation, it is reasonable to expect that switching times will be the same length at corresponding switching points in each subsequent cycle. Therefore if a switching sequence is initiated after a delay TS which is equivalent to the difference between a fixed time interval T and the previous cycle switching time, actual switching should occur after a full time interval T.

The means used to achieve this result are illustrated by other waveforms of FIG. 1. A signal OP representing the inverter output pole voltage is shown in FIG. 1D. Switching delays D1, D2 and D3 are indicated following each transition of control signal CN.

Curve TC of FIG. 1E represents a time keeper which measures switching time of the power pole. This function can be accomplished by a down counter which starts at a count representative of fixed time interval T and begins to count down upon the occurrence of a transition of control signal CN. Counting stops when the power pole switches, leaving a count equivalent to delay time TS, to be used to control a pulse during the next output cycle. This count is then stored in a memory element such as a random access memory or shift register. Alternatively, an up counter can be used as in FIG. 3. In either case, the maximum count of the counter will correspond to the length of fixed time interval T.

Pulse wave W of FIG. 1F causes data from the counter needed in the next output cycle to be entered into a memory element such as a shift register which advances and displays data appropriate to the next switching operation. The number of stages in the shift register is equal to the number of power pole switching operations in an inverter output cycle. Pulse wave R of FIG. 1G resets the counter after its data have been entered into the shift register.

Figure 2:
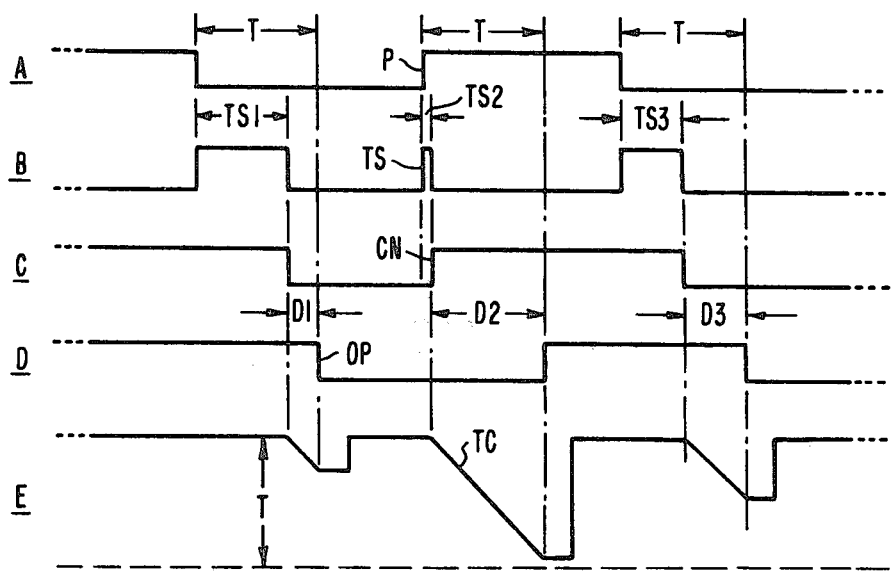
FIG. 2 is a series of waveforms illustrative of the function of an inverter firing control in accordance with the present invention, for an inverter output cycle succeeding the output cycle represented by FIG. 1.

The waveforms of FIG. 2 illustrate the function of the invention for an inverter output cycle succeeding the output cycle represented by FIG. 1. The first transition of control signal CN is delayed by a delay time TS1 which was stored in the memory element based on the power pole switch performance for the corresponding pulse of the previous cycle as illustrated in FIG. 1. For steady state operation, the switch operating time for a given pulse in a cycle should equal the switch operating time for the corresponding pulse in the previous cycle. Therefore, the inverter output OP switches after a delay D1 following the first transition of control signal CN. This results in a switching delay equal to fixed time interval T following a transition of reference signal pulse wave P.

Under steady state conditions, the process continues for each pulse in the output cycle with the sum of the control signal delay TS and the switching delay D always equaling the fixed time interval T. This is readily apparent in FIG. 2 where $(TS1+D1)=(TS2+D2)=(TS3+D3)=T$. An examination of the waveforms of FIG. 1 reveals that the output OP does not switch after a fixed time interval T following a transition in reference pulse wave P. This illustrates the circuit response when a transient condition occurs just prior to the observed sample. When steady state conditions return, the switching schedule will be satisfied.

Figure 3:
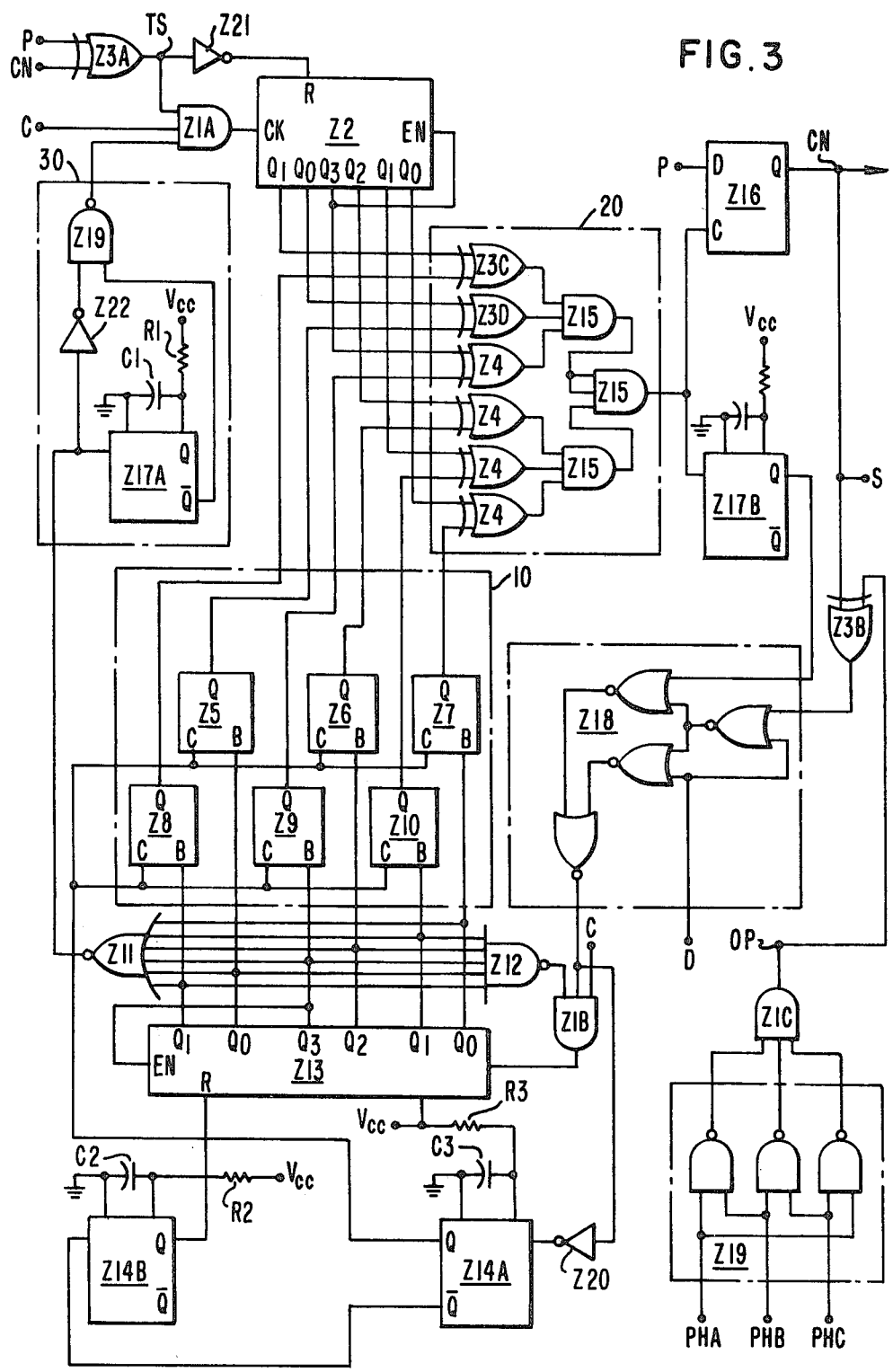
FIG. 3 is a schematic diagram of an inverter firing control circuit constructed in accordance with one embodiment of the present invention.

FIG. 3 is a schematic diagram of a firing control circuit constructed in accordance with one embodiment of the invention. Reference signal P and control signal CN are connected to the input terminals of exclusive OR gate Z3A. The output signal of gate Z3A is delay signal TS. Assuming that the inverter has been operating and the load has been changed just before the current cycle begins, a logic word representing the length of each pulse in delay signal TS for the previous inverter output cycle will be stored in memory element 10 of the circuit. In this embodiment, the memory element 10 is a shift register comprising gates Z5, Z6, Z7, Z8, Z9 and Z10. For explanatory purposes, assume that initially reference signal P and control signal CN are both high. When P goes low, the delay signal TS goes high. Since TS is connected through logic inverter Z21 to the reset terminal R of counter Z2, and also to an input of AND gate Z1A, counter Z2 will begin to count clock pulses being received from terminal C via AND gate Z1A, as long as the output of NAND gate Z19 is high. The function of NAND gate Z19 is discussed below.

The output of counter Z2 is a logic data word which is connected to the input of comparator 20 as is the output of memory element 10 which is a logic data word representing the length of the corresponding inverter output pulse delay time in the preceding cycle. Comparator 20 comprises a plurality of exclusive OR gates Z3C, Z3D and Z4 and a plurality of AND gates Z15 connected such that an output signal develops when the output data words from counter Z2 and memory 10 become binary complementary. If a down counter were used for counter Z13, a comparator would be used which develops an output signal when the data words from counter Z2 and memory 10 are equivalent. The comparator output is connected to a type D flip-flop Z16 which gives an output control signal CN agreeing with reference P. The control signal CN and reference P are then in agreement at the input of exclusive OR gate Z3A. This drives delay signal TS low, which instructs AND gate Z1A to stop transmitting clock pulses to counter Z2.

Control signal CN is connected to the inverter pole where it acts to trigger switching and is also connected to an input of exclusive OR gate Z3B. A plurality of NAND gates Z19 is connected to receive inverter output signals PHA, PHB and PHC. The outputs of Z19 are connected through AND gate Z1C to exclusive OR gate Z3B. As a result exclusive OR gate Z3B produces a high output when control signal CN and the inverter output signals disagree. This high output passes through a plurality of NOR gates Z18 and AND gate Z1B to enable counter Z13. Clock pulses which enter counter Z13 from terminal C through AND gate Z1B are counted by counter Z13 until control signal CN and the inverter outputs agree. At that time, one of the inputs to AND gate Z1B goes low, stopping the transmission of clock pulses to counter Z13. This results in counter Z13 counting up to a data word which represents the switching delay time of the power pole switch in the inverter.

NAND gate Z12 receives inputs from all but one output data line of counter Z13 and produces a logic low output should all but the least significant of the data lines become logic highs. This stops the transmission of clock pulses through AND gate Z1B, thereby stopping the count in counter Z13 one short of its maximum value which corresponds to the length of fixed time interval T. This assures that counter Z13 will not count through its maximum count and recycle.

When the inverter output and control signal CN agree, the output of gate Z18 goes to a logic low. This signal passes to one-shot multivibrator Z14A through logic inverter Z20. The Q output of one-shot Z14A is connected to memory element 10 and causes memory 10 to shift the data to the next cell and store new data from counter Z13. The $\overline{Q}$ output of one-shot Z14A is connected to the input of one-shot multivibrator Z14B which produces an output Q to reset counter Z13 after one-shot Z14A has timed out, providing a time delay which allows the shifting of memory 10 before resetting of counter Z13.

NOR gate Z11 has inputs connected to each output of counter Z13 and provides a logic high to coupling circuit 30 when the output of counter Z13 is all zeros. When counter Z13 begins to count NOR gate Z11 goes to logic low causing one-shot Z17A to produce a logic high pulse at its $\overline{Q}$ output and logic inverter Z22 to also produce a logic high. NAND gate Z19 responds to its two high inputs by producing a logic low output which is fed to AND gate Z1A thus inhibiting transmission of clock pulses to counter Z2 for the duration of the counting sequence of counter Z13. This lock-out of counter Z2 assures the proper operating sequence of the two counters. Once counter Z13 has counted and has been reset producing logic zeros at all its output terminals. NOR gate Z11 produces a logic high which is transmitted through coupling circuit 30 to AND gate Z1A thereby allowing clock pulses to reach counter Z2 at the appropriate time. Coupling circuit 30 is included only to ensure proper start-up of the control circuit. One-shot Z17A provides a relatively long output pulse so as to not interfere with signals initiated by counter Z13. Coupling circuit 30 assures that the clock signal to counter Z2 cannot be permanently inhibited in case counter Z13 does not contain all zeros when the circuit is first turned on.

Terminals $V_{cc}$ are connected to a D.C. voltage supply which is 15 volts in this embodiment. The number of data bits used in the counters and shift register determines the resolution of the circuit. It should be apparent that counters and shift registers can be selected to provide the resolution required in a specific circuit application. Capacitors C1 through C4 in conjunction with resistors R1 through R4 set the output pulse times of the circuit one-shot multivibrators.

It is usual in the operation of switching inverters to establish a running condition of the control circuits before turning on the power stage. This not only sets the stage for stable operation, but also provides a means for monitoring the operation of the control circuits. The control circuit can be made to operate in the absence of a switched output by providing a substitute signal. In FIG. 3, a terminal labeled D provides a means of choosing between two signals to allow the operation of counter Z13. When terminal D is connected to a logic low signal, circuit operation proceeds as described above. When terminal D is connected to a logic high signal, the normal signal input to gate Z18 is blocked, and a substitute signal is allowed to operate AND gate Z1B. The substitute signal is derived by one shot multivibrator Z17B starting with each change of control signal CN. Then the control circuit operates in the normal manner with the delay between reference signal P and control signal CN determined by the length of the output pulse of one shot Z17B.

Although the waveforms of FIGS. 1 and 2 are concerned with a single pole inverter where the output signal OP represents the pole switching characteristic, the circuit of FIG. 3 shows an example of multiple pole operation. In the circuit shown in FIG. 3, terminals PHA, PHB and PHC are connected to signals which represent a pole switching characteristic of each pole in a three phase system. Multiplexing these signals permits a single control circuit to control all three pole switches.

One modulation pattern or a three phase inverter would switch a given pole only during a period of less than 60 degrees. Then that pole would be held in a constant state for more than 120 degrees before being switched again. During the 120 degree non-switched period, each of the other phases may be switched in sequence. Thus all three phases are switched in identical patterns, but only one at a time in sequence. The output signal OP therefore represents the output of one pole, then another, etc. By steering the control signal CN to each phase at the proper time in 60 degree segments all three phases may be controlled. As shown in FIG. 3, the output signal OP may be derived using simple majority logic such as gate array Z19, since at the time that any phase is being switched, the other two phases are opposite in polarity and steady.

Figure 4:
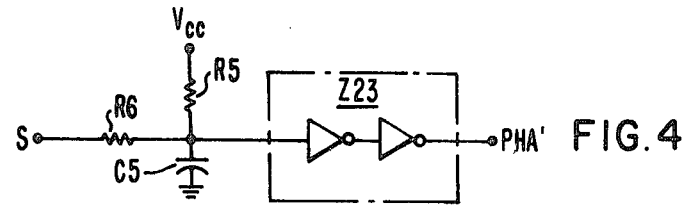
FIG. 4 is a schematic diagram of a test circuit for use with the inverter firing control represented by FIG. 3.

FIG. 4 is a schematic diagram of a test circuit to be used with the circuit of FIG. 3. Control signal CN is received via terminal S and used to produce a simulated phase output signal PHA'. When the simulated output signal is connected to a phase input of FIG. 3, such as terminal PHA with PHB and PHC logically opposite, the circuit will function as if it were controlling an inverter having delayed switching of its poles.

Inverters which utilize control circuits in accordance with this invention should exhibit only a small amount of D.C. voltage in the output due to switching fidelity. Nevertheless, a small amount of D.C. content is likely to be present because of slight switching errors and differences in switch voltage drops.

Figure 5:
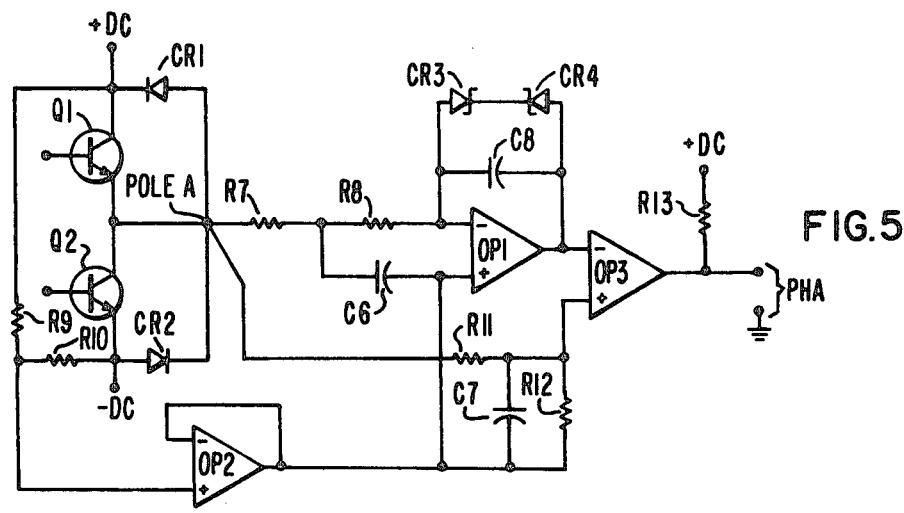
FIG. 5 is a schematic diagram of a D.C. compensation circuit in accordance with one embodiment of the present invention.

FIG. 5 is a schematic diagram of a circuit for detecting direct voltage in the inverter output relative to the center of the D.C. source and for providing a compensation signal which modifies the apparent switching points of the inverter output and is fed as the pole signal input to the circuit of FIG. 3. The inverter D.C. source is connected between terminals +DC and −DC. Transistors Q1 and Q2 are the witching elements for POLE A of the inverter. Capacitor C6 is connected to POLE A through resistor R7. The bulk of the A. C. component of the pole voltage is dropped in resistor R7, while the D.C. component appears on capacitor C6. An integrator comprising capacitor C8, resistor R8, amplifier OP1, and diodes CR3 and CR4, accumulates D.C. voltseconds from capacitor C6 and produces a compensation signal which is clamped by diodes CR3 and CR4 to less than the pole voltage signal. The combination of resistors R9 and R10 and amplifier OP2 provides a D.C. neutral voltage signal to the non-inverting input of amplifier OP1.

The compensation signal produced by the integrator is fed to the inverting input of comparator OP3 as a reference signal. The non-inverting input of comparator OP3 is connected to POLE A by means of a voltage divider comprising resistors R11 and R12. Capacitor C7 provides a controlled slope on the pole voltage signal applied to the comparator. In multiple pole inverters, the circuit of FIG. 5 would be duplicated for each pole.

Figure 6:
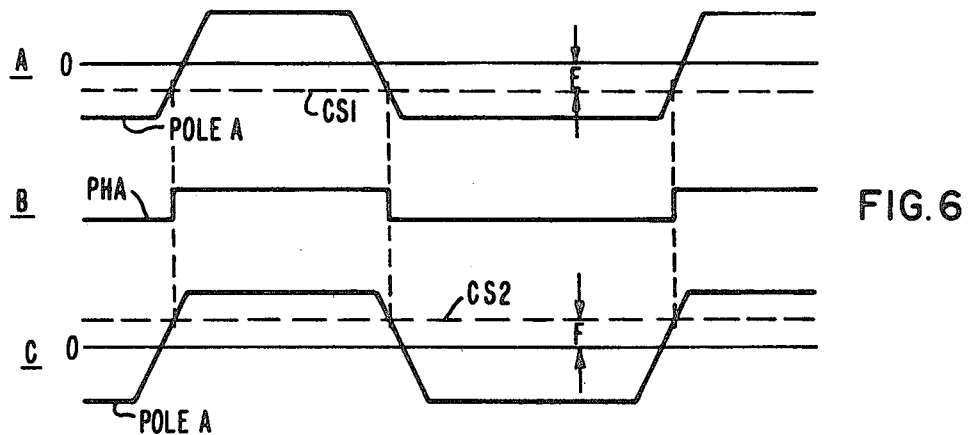
FIG. 6 is a series of waveforms illustrative of the function of the D.C. compensation circuit of FIG. 5.

The operation of the compensation signal is illustrated by the waveforms of FIG. 6. FIG. 6A shows a controlled slope waveform representative of the output for pole A which contains a positive D.C. error voltage. In response to this error, the circuit of FIG. 5 will produce a D.C. compensation signal CS1 with a magnitude E due to the D.C. error voltage but of opposite polarity. The output signal of the circuit of FIG. 5, PHA, changes at the crossover points of the pole voltage and the D.C. compensation signal. This is illustrated by the pulse compensation signal of FIG. 6B. Without compensation, pole signal PHA would switch when the pole voltage crossed the zero axis. It should be apparent that the addition of the D.C. compensation signal has increased the positive pulse width of PHA and decreased the negative pulse width. The actual pulse width of the inverter power pole depends on the level of D.C. compensation signal. When the modified PHA signal is fed to the circuit of FIG. 3, the positive pulse width of the inverter output pulses will be reduced, thereby reducing the positive D.C. error in the inverter output. Once the D.C. content of the inverter output becomes zero, the D.C. compensation signal from the integrator remains constant until a D.C. component appears again in the output voltage.

FIG. 6C shows an example of a pulse compensation signal CS2 for the case where the output of pole A contains a negative D.C. component. Compensation signal CS2 has a magnitude F due to the D.C. error voltage but of opposite polarity. Since switching occurs at the cross-over points of the pole voltage and the compensation signal, the positive pulse width of PHA would be decreased. When the modified PHA signal is fed back to the circuit of FIG. 3, the positive pulse width of the inverter output will increase to compensate for the negative D.C. error component.

By way of further example, the following table identifies specific components that may be used in an inverter firing control in accordance with one embodiment of this invention. It will be apparent to those skilled in the art that other components may be used within the scope of this invention.

| Integrated Circuits | |
| --- | --- |
| Z1, Z15 | MC14073B |
| Z2, Z13 | MC14520B |
| Z3, Z4 | MC14070B |
| Z5, Z6, Z7, Z8, Z9, Z10 | MC14557B |
| Z11 | MC14078B |
| Z12 | MC14068B |
| Z14 | MC14528B |
| Z16 | MC14013B |
| Z17 | MC14538B |
| Z18 | MC14001B |
| Z19 | MC14011B |
| Z20, Z21, Z22, Z23 | MC14049B |
| OP1 | 741 |
| OP2 | 741 |
| OP3 | LM111 |
| Resistors | |
| R1 | 30 K |
| R2, R3 | 5.6 K |
| R4, R8, R12, R13 | 10 K |
| R5 | 58 K |
| R6 | 20 K |
| R7, R9, R10, R11 | 200 K |
| Capacitors | |
| C1, C5 | 0.001 μf |
| C2, C3, C7 | 100 pf |
| C4 | 1000 pf |
| C6 | 1.0 μf |
| C8 | 0.01 μf |
| Diodes | |
| CR3, CR4 | IN5104 |

Diodes CR1 and CR2 and transistors Q1 and Q2 are components in the inverter circuit which is being controlled by this invention.

While the preferred embodiment of the invention has been described, it will be apparent to those skilled in the art that various modifications may be made therein without departing from the scope of the invention.

What is claimed is:

1. A pole switch firing control circuit for controlling a pulse width modulated inverter in accordance with a reference pulse signal, said control circuit comprising:
   means for measuring switching time of the pole switch for a given pulse in a first output cycle of the inverter;
   means for subtracting said switching time from a preselected time interval to obtain a delay time; and
   means for generating a control signal for initiating a pole switch switching sequence for a second pulse corresponding to said given pulse in a second output cycle, succeeding said first output cycle, wherein initiation of said pole switching sequence occurs after a period equal to said delay time following a transition point of a pulse in said reference signal.

2. A pole switch firing control circuit as recited in claim 1, wherein said means for measuring switch switching time comprises:
   a clock signal containing voltage pulses; and
   a first counter for counting said clock voltage pulses, said counter being enabled between a transition point in said control signal and a firing point of said pole switch in response to said transition point in said control signal.

3. A pole switch firing control circuit as recited in claim 2, wherein said means for subtracting said pole switch switching time comprises:
   memory means for storing a binary data word wherein the maximum value of said data word equals the number of clock pulses occurring within said preselected time interval;
   said binary data word, for a given inverter output pulse, being the number of clock pulses counted by said first counter for a corresponding inverter output pulse in the preceding output cycle;
   a second counter for counting said clock voltage pulses, said second counter being enabled between a pulse transition point in said reference signal and a pulse transition point in said control signal; and
   a comparator for comparing said memory binary data word with the number of clock voltage pulses counted by said second counter and for producing a comparator output signal when said memory binary data word and said number of clock voltage pulses counted by said second counter are binary complementary.

4. A pole switch firing control circuit as recited in claim 3, wherein said means for generating a control signal comprises:
   a flip-flop having two inputs;
   one of said flip-flops inputs being connected to receive said reference pulse signal; and
   the second of said flip-flop inputs being connected to receive said comparator output signal, whereby said flip-flop output is said control signal.

5. A pole switch firing control circuit as recited in claim 3, wherein said memory means is a shift register:
said shift register having a number of cells equivalent to the number of inverter output pulses in each output cycle.

6. A pole switch firing control circuit as recited in claim 3, wherein said comparator comprises:
a plurality of exclusive OR gates, each of said OR gates having one input connected to one bit of the output of said second counter and one input connected to one bit of said memory means data word; and
a plurality of logic gates responsive to said OR gates for producing a comparator output signal when all outputs of said exclusive OR gates are of the same logic value.

7. A pole switch firing control circuit as recited in claim 1, further comprising:
means for adjusting inverter output pulse widths to minimize D.C. content of the output of the inverter.

8. A pole switch firing control circuit as recited in claim 7, wherein said means for adjusting inverter output pulse widths comprises:
integrating means for integrating D.C. content of said inverter output, and for producing a D.C. compensation signal proportional to the integrated D.C. content;
means for generating a pulse signal proportional to said inverter output pulses, wherein said pulse of said pulse signal has a controlled slope; and
a comparator for comparing said D.C. compensation signal with said pulse signal and for producing a pulse train wherein the transition points of said pulse train correspond to crossover points of said D.C. compensation signal and said pulse signal.

9. A pole switch firing control circuit as recited in claim 1, wherein said means for measuring switching time comprises:
a clock signal containing voltage pulses; and
a first counter for counting said clock voltage pulses, said counter having a maximum count equivalent to said preselected time interval and being enabled to count down from said maximum count, during a time interval between a transistion point in said control signal and a firing point of said pole switch in response to said transition point in said control signal.

10. A pole switch firing control circuit as recited in claim 9, wherein said means for subtracting said switching time comprises:
memory means for storing a binary data word, said binary data word equalling the count at which said first counter stopped counting for a corresponding inverter output pulse in the preceding output cycle;
a second counter for counting said clock voltage pulses, said second counter being enbled during a time interval between a pulse transition point in said reference signal and a pulse transition in said control signal; and
a comparator for comparing said memory binary data word with the number of clock voltage pulses counted by said second counter and for producing a comparator output signal when said memory binary data word and the number of clock voltage pulses counted by said second counter are equal.

11. A pole switch firing control circuit as recited in claim 10, wherein said means for generating a control signal comprises:
a flip-flop having two inputs;
one of said flip-flop inputs being connected to receive said reference pulse signal; and
the second of said flip-flop inputs being connected to receive said comparator output signal, whereby said flip-flop output is said control signal.

12. A method of controlling the switching of a power pole switch in a pulse modulated inverter in accordance with a reference pulse signal, said method comprising:
measuring a switching time of said pole switch for a given pulse in an output cycle of said inverter;
subtracting said switching time from a preselected fixed time interval to obtain a delay time; and
initiating a switching sequence for said pole switch for a corresponding pulse in the succeeding output cycle, said initiating step occurring after a period equal to said delay time following a transition of a pulse in said reference pulse signal.

13. A D.C. compensation circuit for producing a pulse compensation signal proportional to the D.C. content of an inverter output, said compensation circuit comprising:
integrating means for integrating D.C. content of said inverter output, and for producing a D.C. compensation signal proportional to the integrated D.C. content;
means for generating a pulse wave proportional to said inverter output, wherein each pulse of said pulse wave has a controlled slope; and
a comparator for comparing said D.C. compensation signal with said pulse wave and for producing a pulse compensation signal wherein the transition points of said pulse compensation signal correspond to crossover points of said D.C. compensation signal and said pulse wave.

14. A D.C. compensation circuit as recited in claim 13, wherein said integrating means is referenced to the center point of a D.C. source used to power said inverter.

* * * * *